United States Patent
Khajuria et al.

(10) Patent No.: US 9,348,636 B2
(45) Date of Patent: *May 24, 2016

(54) TRANSFERRING FILES USING A VIRTUALIZED APPLICATION

(71) Applicant: Bromium, Inc., Cupertino, CA (US)

(72) Inventors: Deepak Khajuria, San Jose, CA (US); Kiran Bondalapati, Los Altos, CA (US); Vikram Kapoor, Cupertino, CA (US); Gaurav Banga, Cupertino, CA (US); Ian Pratt, Cambridge (GB)

(73) Assignee: Bromium, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,889

(22) Filed: Sep. 5, 2014

(65) Prior Publication Data

US 2014/0380315 A1  Dec. 25, 2014

Related U.S. Application Data

(63) Continuation of application No. 13/526,354, filed on Jun. 18, 2012, now Pat. No. 8,839,245.

(51) Int. Cl.
 *G06F 9/455* (2006.01)
 *G06F 17/30* (2006.01)

(52) U.S. Cl.
 CPC ...... *G06F 9/45558* (2013.01); *G06F 17/30233* (2013.01); *G06F 2009/45595* (2013.01)

(58) Field of Classification Search
 None
 See application file for complete search history.

(56) References Cited

U.S. PATENT DOCUMENTS

| | | | |
|---|---|---|---|
| 6,018,342 | A | 1/2000 | Bristor |
| 6,122,741 | A | 9/2000 | Patterson et al. |
| 6,948,044 | B1 | 9/2005 | Chandrasekaran |
| 6,959,420 | B1 | 10/2005 | Mitchell et al. |
| 7,139,799 | B2 | 11/2006 | Qian et al. |
| 7,171,523 | B2 | 1/2007 | Yamasaki |

(Continued)

FOREIGN PATENT DOCUMENTS

WO  2008073618 A2  6/2008

OTHER PUBLICATIONS

Mai, et al., "A Case for Parallelizing Web Pages", retrieved from https://www.usenix.org/system/files/conference/hotpar12/hotpar12-final58.pdf, published Jun. 7, 2012.

(Continued)

*Primary Examiner* — Sisley Kim
(74) *Attorney, Agent, or Firm* — Brokaw Patent Law PC; Christopher J. Brokaw

(57) ABSTRACT

Approaches for transferring a file using a virtualized application. A virtualized application executes within a virtual machine residing on a physical machine. When the virtualized application is instructed to download a file stored external to the physical machine, the virtualized application displays an interface which enables at least a portion of a file system, maintained by a host OS, to be browsed while preventing files stored within the virtual machine to be browsed. Upon the virtualized application receiving input identifying a target location within the file system, the virtualized application stores the file at the target location. The virtualized application may also upload a file stored on the physical machine using an interface which enables at least a portion of a file system of a host OS to be browsed while preventing files in the virtual machine to be browsed.

24 Claims, 6 Drawing Sheets

(56) References Cited

U.S. PATENT DOCUMENTS

| | | |
|---|---|---|
| 7,836,303 B2 | 11/2010 | Levy et al. |
| 7,979,807 B2 | 7/2011 | Subramaniam |
| 8,112,748 B2 | 2/2012 | Pomerantz |
| 8,146,084 B1 | 3/2012 | Meketa |
| 8,346,727 B1 | 1/2013 | Chester et al. |
| 8,510,237 B2 | 8/2013 | Cascaval et al. |
| 8,543,641 B2 | 9/2013 | Cherukuri et al. |
| 8,561,208 B2 | 10/2013 | Corbett et al. |
| 8,763,136 B2 | 6/2014 | Li |
| 8,776,169 B2 | 7/2014 | Rajagopal et al. |
| 2004/0128670 A1 | 7/2004 | Robinson et al. |
| 2005/0149726 A1 | 7/2005 | Joshi et al. |
| 2005/0188361 A1* | 8/2005 | Cai et al. .................. 717/148 |
| 2006/0101189 A1 | 5/2006 | Chandrasekaran et al. |
| 2006/0112342 A1 | 5/2006 | Bantz et al. |
| 2006/0136910 A1* | 6/2006 | Brickell et al. .................. 718/1 |
| 2006/0143617 A1 | 6/2006 | Knauerhase et al. |
| 2006/0184937 A1 | 8/2006 | Abels et al. |
| 2006/0288343 A1 | 12/2006 | Pallister |
| 2007/0089111 A1 | 4/2007 | Robinson et al. |
| 2007/0143271 A1* | 6/2007 | Yuval et al. .................. 707/3 |
| 2007/0180450 A1 | 8/2007 | Croft et al. |
| 2007/0192329 A1 | 8/2007 | Croft et al. |
| 2007/0234337 A1* | 10/2007 | Suzuki et al. ................. 717/168 |
| 2008/0001958 A1 | 1/2008 | Vembu et al. |
| 2008/0133722 A1 | 6/2008 | Ramasundaram et al. |
| 2008/0178290 A1* | 7/2008 | Besch .................. G06F 21/53 726/22 |
| 2008/0313648 A1 | 12/2008 | Wang et al. |
| 2009/0007242 A1 | 1/2009 | Subramanian et al. |
| 2009/0070869 A1 | 3/2009 | Fan et al. |
| 2009/0119541 A1 | 5/2009 | Inoue et al. |
| 2009/0125902 A1 | 5/2009 | Ghosh et al. |
| 2009/0158140 A1 | 6/2009 | Bauchot et al. |
| 2009/0165133 A1 | 6/2009 | Hwang et al. |
| 2009/0172820 A1 | 7/2009 | Watson |
| 2009/0249472 A1 | 10/2009 | Litvin et al. |
| 2009/0276783 A1 | 11/2009 | Johnson et al. |
| 2009/0284535 A1 | 11/2009 | Pelton et al. |
| 2009/0313620 A1 | 12/2009 | Sedukhin et al. |
| 2009/0328033 A1 | 12/2009 | Kohavi et al. |
| 2010/0017756 A1 | 1/2010 | Wassom, Jr. et al. |
| 2010/0122343 A1 | 5/2010 | Ghosh et al. |
| 2010/0146523 A1* | 6/2010 | Brigaut .............. G06F 17/30203 719/330 |
| 2010/0192224 A1 | 7/2010 | Ferri et al. |
| 2010/0198973 A1* | 8/2010 | Jung et al. .................. 709/226 |
| 2010/0199199 A1 | 8/2010 | Kumar et al. |
| 2010/0235831 A1 | 9/2010 | Dittmer |
| 2010/0306773 A1 | 12/2010 | Lee et al. |
| 2010/0306849 A1 | 12/2010 | Zheng et al. |
| 2011/0035494 A1 | 2/2011 | Pandey et al. |
| 2011/0173251 A1 | 7/2011 | Sandhu et al. |
| 2011/0289546 A1* | 11/2011 | Pieczul .............. H04L 63/1408 726/1 |
| 2011/0296487 A1 | 12/2011 | Walsh |
| 2011/0302577 A1 | 12/2011 | Reuther et al. |
| 2012/0089666 A1 | 4/2012 | Goswami et al. |
| 2012/0246598 A1 | 9/2012 | Narayanan |
| 2012/0288012 A1 | 11/2012 | Staikos et al. |
| 2013/0086202 A1 | 4/2013 | Connelly et al. |
| 2013/0246563 A1 | 9/2013 | Cardozo |
| 2013/0254829 A1 | 9/2013 | Jakubowski et al. |
| 2014/0123319 A1 | 5/2014 | Porjo et al. |

OTHER PUBLICATIONS

Barth, et al., "The Security Architecture of the Chromium Browser", retrieved from https://web.archive.org/web/20091229163137/http://seclab.stanford.edu/websec/chromium/chromium-security-architecture.pdf.

\* cited by examiner

TRANSFERRING FILES USING A VIRTUALIZED APPLICATION

RELATED APPLICATION DATA

This application claims priority to, and is a continuation of, U.S. non-provisional patent application Ser. No. 13/526,354, filed Jun. 18, 2012, entitled "Transferring Files Using a Virtualized Application," the contents of which are hereby incorporated by reference for all purposes as if fully set forth herein.

This application is related to U.S. non-provisional patent application Ser. No. 13/115,354 (the "'354 patent"), filed May 25, 2011, which has a priority date of May 28, 2010, entitled "Approaches for Securing an Internet Endpoint using Fine-Grained Operating System Virtualization," the contents of which are hereby incorporated by reference for all purposes as if fully set forth herein.

This application is related to U.S. non-provisional patent application Ser. No. 13/223,091, filed Aug. 31, 2011, entitled "Automated Management of Virtual Machines to Process Untrusted Data Based on Client Policy Information," the contents of which are hereby incorporated by reference for all purposes as if fully set forth herein.

This application is related to U.S. non-provisional patent application Ser. No. 13/302,123, filed Nov. 22, 2011, entitled "Approaches for Efficient Physical to Virtual Disk Conversion," invented by Gaurav Banga et al., the contents of which are hereby incorporated by reference for all purposes as if fully set forth herein.

This application is related to U.S. non-provisional patent application Ser. No. 13/419,345, filed Mar. 13, 2012, entitled "Seamless Management of Untrusted Data Using Virtual Machines," invented by Gaurav Banga et al., the contents of which are hereby incorporated by reference for all purposes as if fully set forth herein.

This application is related to U.S. non-provisional patent application Ser. No. 13/358,434, filed Jan. 25, 2012, entitled "Approaches for Protecting Sensitive Data Within a Guest Operating System," invented by Gianni Tedesco et al., the contents of which are hereby incorporated by reference for all purposes as if fully set forth herein.

This application is related to U.S. non-provisional patent application Ser. No. 13/468,742, filed May 10, 2012, entitled "Reducing Memory Requirements for Guest Operating Systems," invented by Krzysztof Uchronski et al., the contents of which are hereby incorporated by reference for all purposes as if fully set forth herein.

This application is related to U.S. non-provisional patent application Ser. No. 13/468,781, filed May 10, 2012, entitled "Preparing a Virtual Machine for Template Creation," invented by Krzysztof Uchronski et al., the contents of which are hereby incorporated by reference for all purposes as if fully set forth herein.

This application is related to U.S. non-provisional patent application Ser. No. 13/468,805, filed May 10, 2012, entitled "Managing the Eviction Process," invented by Krzysztof Uchronski et al., the contents of which are hereby incorporated by reference for all purposes as if fully set forth herein.

This application is related to U.S. non-provisional patent application Ser. No. 13/468,843, filed May 10, 2012, entitled "Mitigating Eviction by Maintaining Mapping Tables," invented by Krzysztof Uchronski et al., the contents of which are hereby incorporated by reference for all purposes as if fully set forth herein.

FIELD OF THE INVENTION

Embodiments of the invention relate to transferring a file using a virtualized application.

BACKGROUND

Ensuring the security of computer networks and network connected devices is one of the grand challenges facing us today. The current state of affairs is very problematic, as our cyber-security infrastructure is routinely subverted by cyber criminals, resulting in great economic loss, invasion of privacy, and loss of productivity.

Certain web browsers have attempted to provide a level of security by isolating downloaded code. However, present approaches for doing so are fairly primitive in their ability to deal with the full gamut of security issues that arise during the course of a typical user's web experience. For example, the sandboxing capability of certain versions of Google's web browser does not address safety issues arising from downloaded browser plugins and various types of native executables, and therefore, possesses a vulnerability to a zero day exploit attack that via Adobe Flash or Microsoft Word.

Web browser vendors rely upon monetizing the web browsing habits of their users within their own business processes and with their industry partners. This monetization relies, at least in part, on data about users' browsing habits which is stored in the web cookies that are set and later provided to web servers during the course of web sessions. Companies such as Google and Microsoft have a great interest in learning as much as possible about a person's browsing habits and typically arrange the default privacy settings of web browsers to be advantageous to them, but less than optimal from a security and privacy standpoint. The default privacy settings causes web browsers to transfer large amounts of sensitive information from users' machines to Internet related businesses, such as Google, Microsoft, Apple, etc., thereby allowing such businesses to better monetize their customer base by offering appropriate products and services and serving targeted ads. These same settings, however, can be leveraged by malicious parties to exploit security vulnerabilities. While all web browsers provide some level of control to the sophisticated user to tune his or her web browser privacy settings, the vast majority of users never change the default settings.

According to some current approaches for enhancing the security of a computer, the computer runs multiple independent operating systems using multiple virtual machines (VMs) within the computer. Multiple virtual machines may be created using a hypervisor, such as from VMware of Palo Alto, Calif. or Virtual PC, available from Microsoft Corporation of Redmond, Wash. When client virtualization is used to achieve improved security, different VMs are used to run different types or classes of applications. For example, an operating system in one VM may be dedicated for accessing the corporate network that the user may be part of and running corporate applications (local and web). Another operating system in a second VM might be used by the user to run his or her personal programs and store personal documents. Finally, a different operating system in a third VM may be used for general web browsing on the wider Internet and running native executables that may have been downloaded from the Internet. An example of such a solution is XenClient, which is made by Citrix Systems of Ft Lauderdale, Fla.

This use of classical client virtualization suffers from several drawbacks. One drawback is that there is too much management overhead for the end-user. The end-user has the onus of making the decision as to what VM to use for each activity. Any mistake, intentional or accidental, may subvert the integrity of the system. While many safeguards can be added as a layer on top of the core virtualization technology to help prevent the user from making mistakes, this has not yet been demonstrated to work in a practical and robust fashion.

Another drawback is that any VM that is used for general web browsing is just as vulnerable to a security problem as any monolithic system running a single VM while accessing web sites on the general Internet. Therefore, it is quite likely that any VM dedicated to web browsing described in the arrangement above will be subverted by malware eventually. Any subsequent activities in that VM, then, will be compromised.

For these and other reasons, client virtualization has not been used widely to improve the security of computer systems.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF EMBODIMENTS

Figure 1:
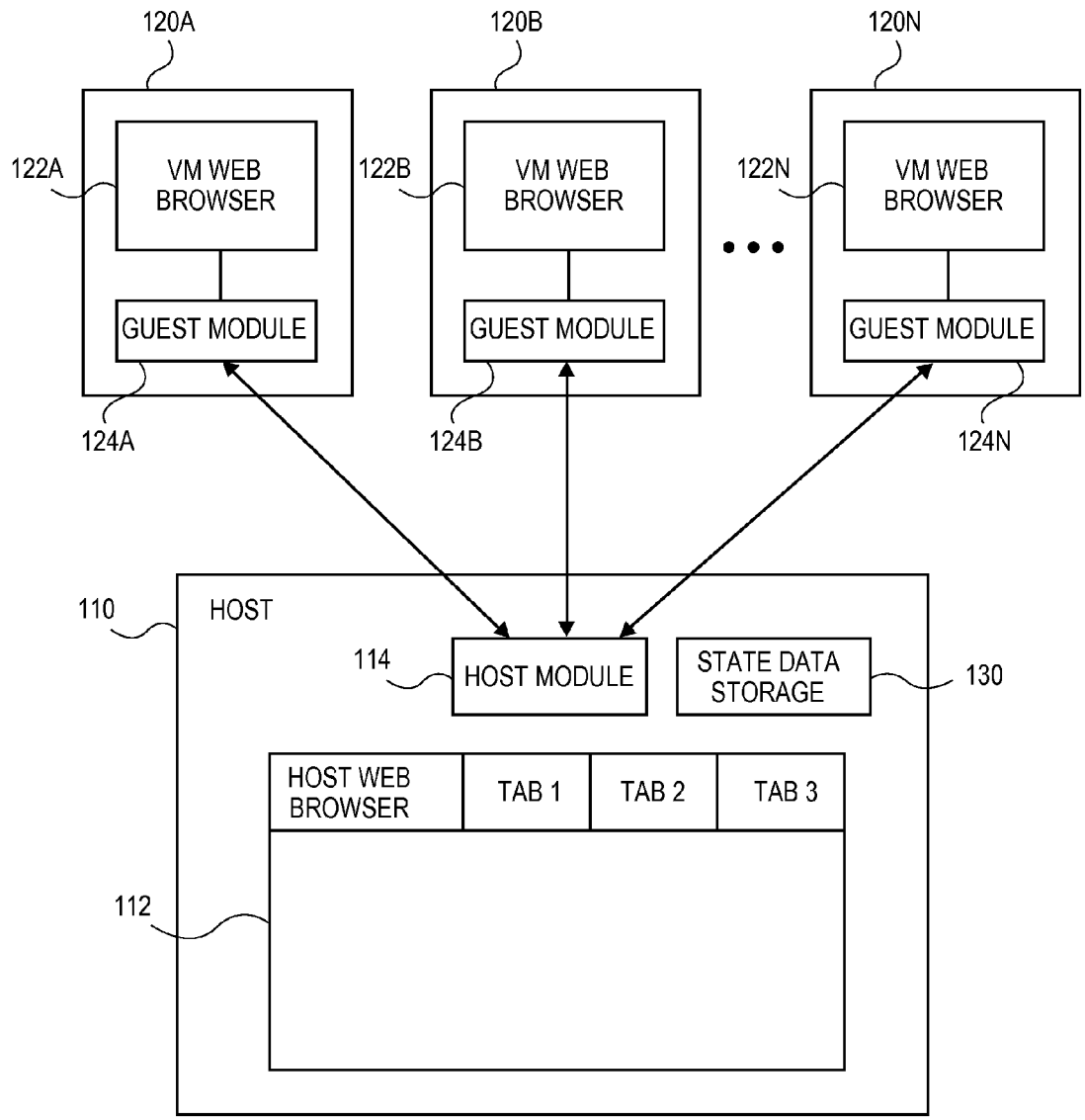
FIG. 1 is a block diagram of system according to one embodiment of the invention.

Approaches for transferring a file using a virtualized application are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Virtualized Web Browser

Embodiments of the invention are directed towards a virtualized web browser. A virtualized web browser refers to a plurality of components that cooperate to provide a secure web browsing experience. A characteristic of a virtualized web browser is that a portion of the components implementing the virtualized web browser resides in the host while another portion of the components implementing the virtualized web browser resides in one or more virtual machines. While the portion of the virtualized web browser that resides in the host is responsible for displaying content, that portion need not retrieve the displayed content from across the network. Instead, the content displayed by a virtualized web browser is typically retrieved by components in one or more virtual machines, although the component(s) of the virtualized web browser residing in the host may retrieve and render content if desired.

A virtualized web browser presents the same user experience as a traditional (or "native") web browser. A person using a virtualized web browser may, in fact, not even realize that they aren't using a traditional web browser. Therefore, a user of a virtualized web browser need not alter their usage patterns and may use a virtualized web browser in the same way as a traditional web browser.

As used herein, the term "web browser" will be used to refer to both traditional web browsers and virtualized web browsers. When specific reference is made to traditional web browsers (i.e., those web browsers which are not virtualized web browsers), the term "traditional web browsers" or "native web browsers" will be used herein.

The types of operations that are typically performed on a web browser include, without limitation, browsing to various web sites, entering information and logging into web pages, navigating back and forth between visited web pages, uploading and downloading content through a web page, and saving and using bookmarks. To support such activity, web browsers maintain temporary and persistent state information to ensure such operations are properly performed.

The desire to ensure that a virtualized web browser offers the same user experience as a traditional web browser requires that virtualized web browsers manage the temporary and persistent state information necessary to perform expected web browser operations across the underlying micro-virtualization environment in which these operations are performed. Many approaches will be presented herein for synchronizing resources of a virtualized web browser so that the virtualized web browser provides a familiar user experience. Prior to doing so however, a more detailed description of how a virtualized web browser of an embodiment operates will be presented.

Anatomy of a Virtualized Web Browser

To better appreciate how a virtualized web browser operates, consider FIG. 1, which is a block diagram of system 100 according to one embodiment of the invention. System 100 includes a virtualized web browser that has components that are implemented on the host as well as on different virtual machines. FIG. 1 depicts host 110 and virtual machines 120A, 120B, . . . 120N. Host 110 corresponds to the host operating system installed upon a device. Host 110 may be embodied by a wide variety of operating systems, either presently available or subsequently developed.

In an embodiment (not depicted in FIG. 1), the functional components residing in host 110 may instead reside in a persistently maintained virtual machine.

Virtual machines 120A, 120B, . . . 120N each represent any type of virtual machine. In an embodiment, virtual machines 120A, 120B, . . . 120N may each correspond to a UCVM discussed in the '354 patent. While FIG. 1 only specifically identifies three virtual machines, namely virtual machines 120A, 120B, and 120N, the graphical notations of FIG. 1 are meant to convey that embodiments of the invention may employ any number of virtual machines. Moreover, during the normal course of operation, virtual machines may be periodically instantiated or destroyed, and so the particular number of virtual machines within system 100 will always be changing during normal operation.

Virtual machines 120A, 120B, ... 120N may reside on the same physical machine as host 110, but they need not. In fact, one or more of virtual machines 120A, 120B, ... 120N may reside on a different physical machine than on which host 110 resides and may communicate with host 110 over a network. For example, host 110 may be implemented on a cell phone, laptop computer, tablet computer, PC, or other device or computer, and virtual machines 120A, 120B, ... 120N may be implemented on one or more separate physical machines located over a network. To facilitate the retrieval of web content, virtual machines 120A, 120B, ... 120N may have a network connection. Note that the particular network settings and network configuration of virtual machines 120A, 120B, ... 120N may be different and specifically tailored to suit the activity assigned thereto.

In a virtualized web browser of an embodiment, different virtual machines may be used to perform user initiated actions such as retrieving requested content from the Internet. Each of virtual machines 120A, 120B, ... 120N is completely isolated from each other and from host 110. As shall be explained below in greater detail, the determination of which virtual machine a particular action should be performed in may be based on policy, as reasons will be discussed for wanting to perform certain actions together in the same virtual machine as well as reasons for wanting to perform various actions in separate virtual machines.

As shown in FIG. 1, host 110 comprises web browser 112 while virtual machines 120A, 120B, ... 120N each comprise web browsers 122A, 122B, ... 122N respectively. For clarity, web browsers 122A, 122B, ... 122N shall be termed VM web browsers to signify that the web browsers execute within a virtual machine in system 100. By the same token, web browser 112 shall be termed host web browser 112 to signify that it executes within host 112.

A virtualized web browser of an embodiment is comprised of host web browser 112, one or more VM web browsers, such as VM web browsers 122A, 122B, and 122N, host module 114, and one or more guest modules, such as guest modules 124A, 124B, and 124N. Host module 114 and guest modules 124A, 124B, and 124N are components which assist in synchronizing resources of the virtualized web browser.

VM web browsers 122A, 122B, and 122N and other applications that are run on behalf of the virtualized web browser in each virtual machine store and update the state of a user's web browser session. However, since each VM web browser is running in an isolated virtual machine, the state changes made to the web browser session made by a particular virtual machine are local to that virtual machine. This provides complete isolation between various user actions, which assists in promoting security; however, isolating virtual machines from one another frustrates certain interfaces and behavior of a web browser that the user expects.

Therefore, host module 114 and guest modules 124A, 124B, and 124N cooperate to share information about certain changes made to the web browser session and synchronize resources when appropriate. The guest module within each virtual machine tracks the resources that are requested and updated by the VM web browser within that virtual machine. For example, guest module 124A within virtual machine 120A tracks the resources that are requested and updated by web browser 122A. Host module 114 coordinates resource synchronization between host 110 and virtual machines 120A, 120B, ... 120N. Host module 114 and the guest modules within each virtual machine communicate over secure communication channels that are not accessible to possible insecure code running in virtual machines 120A, 120B, ... 120N or in host 110.

Host module 114 and guest modules 124A, 124B, and 124N provide an interface to host web browser 112 so that information about the activity in virtual machines 120A, 120B, ... 120N is shared as needed and reflected in the user experience provided by the virtualized web browser. As a result of the activity of host module 114 and guest modules 124A, 124B, ... 124N, the user is not responsible for coordinating the activity of the underlying micro-virtualization of the virtualized web browser.

To illustrate the role played by host module 114 and guest modules 124A, 124B, ... 124N, consider that the VM web browser in each virtual machine maintains its own list of history entries reflecting where that particular VM web browser navigated. However, the user expects that any navigations previously performed by him to show up in the history entries of the virtualized web browser regardless of which particular VM web browser was involved in the navigation. Therefore, operations involving a user's past navigation history should reflect the browsing history of the user regardless of which particular virtual machine was responsible for retrieving the web pages. Host module 114 and guest modules 124A, 124B, ... 124N help ensure that relevant information about the user's browsing activity is shared appropriately between host 110 and virtual machines 120A, 120B, ... 120N so that browsing history behaves as expected.

Another illustration of how host module 114 and guest modules 124A, 124B, ... 124N synchronize resources of a virtualized web browser may be shown by their coordinated support for the use of APIs from popular web sites such as Facebook and Google on third-party web sites. When one visits a third party web site that is integrated with Facebook, the web browser ideally uses secure mechanisms to show content related to your Facebook account on the third party web site. For example, a news web site can show stories that your friends from Facebook "liked" on that news web site. These types of web page features typically use cookies or web protocols such as OAuth. Cookies are resources that are exchanged between the web browser and web sites being visited by the user. If VM web browser 122A executing in virtual machine 120A and the web site being browsed by VM web browser 122A exchange cookies, then the cookies will likely be needed in host 110 (and potentially in other virtual machines as explained below) to ensure that the display of the web page properly integrates with Facebook. Therefore, as shall be explained in more detail below, host module 114 and guest modules 124A, 124B, ... 124N make sure that each virtual machine has the cookies necessary so that the VM web browser executing therein can properly display and render any web page retrieved by that VM web browser.

Operation of a Virtualized Web Browser

Embodiments of the invention seamlessly synchronize resources of a virtualized web browser to present a completely native browser experience to the end user. A wide variety of resources may be coordinated between host 110 and virtual machines 120A, 120B, ... 120N including without limitation: URLs, screen data for all or at least a portion of a web page retrieved by VM web browser, user input (such as keyboard and mouse actions) directed against a web page displayed by a web browser, cookies, navigation history, bookmarks, configuration settings for the web browser, cache files of various types, DOM storage, and files saved and uploaded. Any type of data that indicates a change in state in the user's web browsing experience ("state data") may be synchronized as appropriate between host 110 and virtual machines 120A, 120B, . . . 120N according to embodiments.

Figure 2:
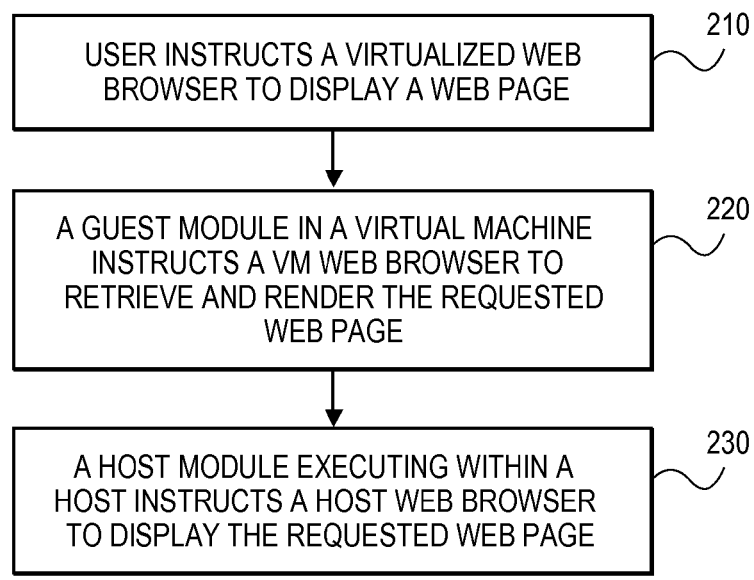
FIG. 2 is a flowchart illustrating the steps of retrieving a web page using a virtualized web browser according to an embodiment of the invention.

Prior to discussing in detail how these types of resources are synchronized, it will be helpful to understand how a virtualized web browser retrieves and displays a requested web page. FIG. 2 is a flowchart illustrating the steps of retrieving a web page using a virtualized web browser according to an embodiment of the invention.

In step 210, a user instructs a virtualized web browser to display a web page. As previously explained, the user may not know that the web browser he or she is using is a virtualized web browser, as the virtualized web browser will exhibit the appearance and behavior of a traditional web browser. However, in all actuality, when a user interacts with a virtualized web browser, the user is actually directly interacting with host web browser 112 executing in host 110.

The user actions taken with respect to host web browser 112 are identified by host module 114 in cooperation with host web browser 112. Embodiments may inform host module 114 of the user actions taken with respect to host web browser 112 using a variety of different techniques. Different types of web browsers and/or host operating system may provide different options for informing host module 114 of user actions directed against host web browser 112, and embodiments of the invention may employ any appropriate manner to do so. Non-limiting, illustrative mechanisms for enabling communication between host web browser 112 and host module 114 include APIs, callbacks, and web browser plug-ins. To recite one specific example, in an embodiment where host web browser 112 is a version of Microsoft Internet Explorer, then Browser Helper Objects (BHO) may be used to inform module 114 of user actions directed against host web browser 112. As another example, host web browser 112 may be augmented with a plug-in that causes host module 114 to be informed of any user input submitted to host web browser 112.

Once host module 114 identifies a user action directed against host web browser 112, host module 114 either performs the request action itself or forwards notice of the requested action to an appropriate virtual machine within system 100 for processing. Host module 114 may consult policy data to determine whether the user action should be processed within host 110 or within a particular virtual machine.

To provide a concrete example, assume the user action is a request to display a web page. Further assume that host module 114, in consultation with policy data, determines that virtual machine 120A is the appropriate virtual machine responsible for retrieving that web page.

In an embodiment, the particular virtual machine selected by host module 114 to process any user input or perform any requested user action will possess characteristics appropriate for the type of activity involved in doing so. In this example, virtual machine 120A should be configured to possess appropriate characteristics for retrieving the type of web page being requested. If the requested web page is a web page on an internal corporate intranet site, then virtual machine 120A should have appropriately tailored configuration settings to do so in a manner that addresses any security concerns. Similarly, if the requested web page is a web page associated with the user's personal bank or other such financial institution, then virtual machine 120A may have a different set of configuration settings to address the particular type of activity and level of risk involved Virtual machine 120A need not be instantiated at the time host module 114 determines that virtual machine 120A should retrieve the web page, as virtual machine 120A may be instantiated on-the-fly. Host module 110 may instruct a hypervisor to create a particular virtual machine using a template that causes the particular virtual machine to have characteristics chosen for particular task at hand, namely retrieving a particular web page in this example. Any instantiated virtual machine will comprise a guest module and may comprise a VM web browser. Additional description of how virtual machines may be implemented on-the-fly with specifically tailored characteristics is described in the previously mentioned '354 patent.

To inform virtual machine 120A to retrieve the requested web page, host module 114 communicates an instruction to guest module 124A within virtual machine 120A to retrieve the requested web page. If VM web browser 122A is not instantiated at the time guest module 124A receives the instruction to retrieve the requested web page, then guest module 124A instantiates VM web browser 122A at that time.

In step 220, guest module 124A instructs VM web browser 122A to retrieve the requested web page. In response, VM web browser 122A retrieves the requested web page and renders the web page. Note that as VM web browser 122A is executing within virtual machine 120A, the rendering of the requested web page by VM web browser 122A will not cause the rendered web page to be visually displayed to the user by VM web browser 122A, but instead, the retrieved web page is merely interpreted without being shown upon a connected display device.

Instead, host web browser 112 is responsible for displaying the retrieved web page on a connected physical display device. To make this so, the visual appearance of the web page rendered by VM web browser 122A is shown as the web page displayed by host web browser 112. In other words, the content that was to be shown by VM web browser 122A is instead shown by host web browser 112.

There are many ways in which the screen of a VM web browser may be displayed to the user by host web browser 112. One way involves guest module 124A generating or obtaining a graphical representation (termed "screen data") of the rendered web page. Screen data is a graphical depiction of at least a portion of the appearance of the web page. Screen data may represent the visual presentation of the entire web page or, as is performed by some embodiments, only a portion of the web page. For example, an uninterpreted web page may be represented as an HTML file, whereas screen data for that web page may be an image file, such as a file in a JPEG, TIF, PNG, or GIF format. Screen data may be embodied using any type of format for defining how to display content, such as a graphical representation.

In an embodiment, after guest module 124A obtains screen data for the requested web page, guest module 124A sends the screen data for the requested web page to host module 114.

In another embodiment, once screen data is generated for the requested web page, host module 114 retrieves the screen data for the requested web page from virtual machine 120A. For example, host module 114 may retrieve the contents from a predetermined location in memory at which the screen data is to be stored.

In an embodiment, other data besides screen data may be obtained by host module 114 in step 220. If guest module 124A retrieves a file or graphic in virtual machine 120A, then the graphic or file may be made available to host module 114. After host module 114 possesses screen data for the requested web page, processing proceeds to step 230.

In step 230, the virtualized web browser processes the data received in step 220 and displays the requested web page. In an embodiment, step 230 is performed by host module 114 instructing host web browser 112 to display the requested web page using the screen data received from guest module 124A. After doing so, the user may physically view the requested page upon a display device, as the visual representation of the web page may be displayed on a physical display device by host web browser 114.

Note that host web browser 112 may display the requested web page using the screen data with or without any visual indicators that identify that the requested web page, or any portion thereof, was not retrieved within host 110 or by host web browser 112. If the use of visual indicators is desired, a specifically-colored border or a window decoration of a special color may be used to denote the host windows or tabs that are being rendered in an untrusted virtual machine.

Using Multiple Virtual Machines to Retrieve a Single Requested Web Page

The description of FIG. 2 was presented in terms of a retrieving a requested web page using a single web browser executing on a single virtual machine. However, this need not be the case in all embodiments, as other embodiments may employ multiple virtual machines to retrieve different portions of a single requested web page. In such an embodiment, host web browser 112 would display the requested web page by displaying the assembled portions of screen data received from the two or more virtual machines involved in retrieving the different portions of the web page.

Figure 3:
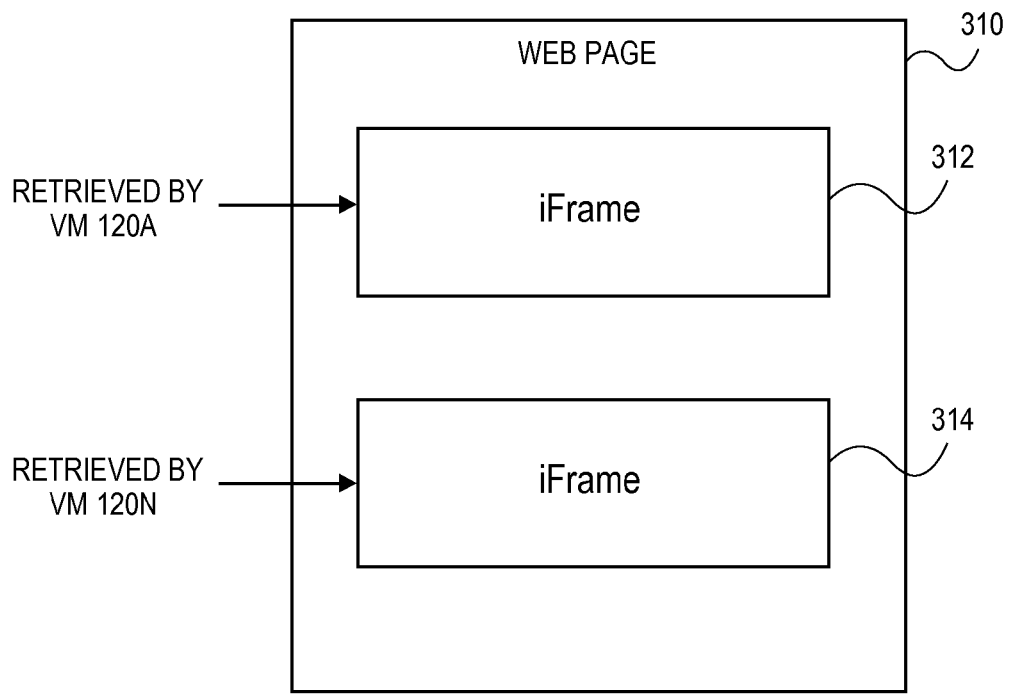
FIG. 3 is a block diagram illustrating which virtual machines in an illustrative system are responsible for retrieving and rendering portions of a single requested web page according to an embodiment of the invention.

To further illustrate such an embodiment, consider FIG. 3, which is a block diagram illustrating which virtual machines in system 100 are responsible for retrieving and rendering portions of a single requested web page according to an embodiment of the invention. FIG. 3 depicts web page 310 that comprises two bounded areas of content 312 and 314. Bounded areas of content 312 and 314 may be identified using a HTML construct called an "iFrame." The iFrame HTML tag is supported by all major web browsers and is a way to demarcate different portions of a web page. Within an iFrame, content may originate from a different source than the web page in which it resides. In other words, web page 310, content within iFrame 312, and content within iFrame 314 may each originate from a different source on the Internet.

When host module 114 receives a request to display a web page, host module 114 may instruct multiple virtual machines to return screen data for certain portions of the requested web page. For example, as depicted in FIG. 3, host module 114 may instruct virtual machine 120A to retrieve screen data for the content web page 310 without any content for iFrame 312 or iFrame 314. Also in this example, host module 114 may instruct virtual machine 120B to retrieve screen data for the content associated with iFrame 312 and may instruct virtual machine 120N to retrieve screen data for the content associated with iFrame 314. The determination of which virtual machine should retrieve screen data for which portion of a requested web page may be made based on policy, as explained in more detail in a later section.

When host module 114 receives screen data from two or more guest modules, host module 114 assembles the graphical images represented by the sets of screen data and instructs host web browser 112 to display the assembled web page. In this way, the web page depicted in FIG. 3 may be shown to the user without the user being informed that content within iFrame 312 and content within iFrame 314 were retrieved in a different virtual machine than web page 310.

It may be advantageous to retrieve different portions of a web page from different virtual machines for security purposes. Content contained within an iFrame may contain malicious code. It is common for advertisements and the like to be included within an iFrame. Advertisements and the like may be served by a third party service. As a result, it is difficult for the operator of a web site to monitor content embedded within a web page of their web site for malicious code. By retrieving the content associated with an iFrame in a separate virtual machine, any malicious code that attempts to access unauthorized resources will be unable to access other portions of the web page, let alone access to sensitive resources outside of the virtual machine in which it executes.

Communication Between the Host Module and the Guest Module During a Browsing Session The steps of FIG. 2 describe how the display of a single requested web page may be performed using a virtualized web browser. During the course of a normal web browsing session, a user will, naturally, interact with a displayed web page, either by clicking a link on the web page, entering and submitting text via a text box, and other more complex click and type interactions. Since different virtual machines may be responsible for retrieving different web pages, or even different portions of the same web page, any interaction of the user with a particular portion of a web page should be handled by the appropriate virtual machine. To do so, host module 114 and one or more guest modules will communicate with each other to support a user's interaction with a displayed web page.

When a user selects a link on web page, clicks a button, submits character data entered via the keyboard, and the like, host module 114 is notified that a user is submitting user input relative to a particular location on a web page. Host module 114 identifies the portion of a displayed web page to which the user input is directed. For example, host module 114 may identify a particular iFrame associated with the submitted character data or a particular link that was selected. In certain embodiments, the host module 114 also identifies where the position of a mouse cursor or any other input, such as input from a light pen, a finger on a display, and the like, relative to the web page. In this way, host module 114 may identify where the mouse pointer is relative to the web page to facilitate the performance of a mouse hover operation or any other such operation that requires the location of the mouse pointer or input mechanism relative to the web page.

Host module 114 identifies, based on policy and results of prior operation of the system, the specific virtual machine responsible for the portion displayed web page to which the user input was directed. Host module 114 then notifies the guest module within the identified virtual machine of the user input. For example, if host module 114 determines that virtual machine 120B is responsible for a web page, then host module forwards the user input to guest module 124B for processing.

Once guest module 124B receives the user input, guest module 124B will instruct VM web browser 122B to act on the user input by performing the action associated with the user input. For example, if the user input identifies a particular location on a web page over which the user clicked a mouse button, then VM web browser 122B will navigate the mouse pointer to the same location, perform a mouse click operation, and process the results. Note that VM web browser 122B will be displaying the same web page as host web browser 114, and so the user input may be processed against the web page displayed by host web browser 114 similarly as if host web browser 114 was actually processing the user input. Once VM web browser 122B has processed the user input (such as, for example, obtaining a requested web page from a remote location in response to the user's mouse click), guest module 124B either sends screen data for the resulting appearance of the content displayed by VM web browser 122B to host module 114, or host module 114 retrieves such screen data directly from virtual machine 120B, so that host module 114 may instruct host web browser 112 to display the screen data to the user.

Guest module 124B may send a request to host module 124B for any information about the user's web browsing session that is pertinent to the processing of the user input. If in this example guest module 124B requires one or more resources from host module 114 to properly process the user input, then guest module 124B may contact host module 114 to obtain such information. For example, if, in order to properly display a web page, guest module 124B determines that a particular cookie is needed, then guest module 124B may obtain the cookie by issuing a request for the cookie to host module 114.

If the user clicks a link on the displayed web page, guest module 124B may send a request to host module 124B to determine if guest module 124B can process a subsequent browsing action. If host module 114 allows this action, guest module 124B will instruct VM web browser 122B to retrieve the web page indicated by the selected link. On the other hand, if host module 114 denies guest module 124B permission to continue processing the web processing requests, host module 114 will instruct another virtual machine to retrieve the web content identified by the selected link. The decision of the host module 114 on whether to allow guest module 124B permission to continue processing browsing requests will be made based on policy data.

Persistently Storing Data and Injecting State Data

Generally, absent special considerations, virtual machines 120A, 120B, . . . 120N are not intended to be persisted ad infinitum. While one or more of virtual machines 120A, 120B, . . . 120N may be persistently stored in certain cases, more commonly such virtual machines will be destroyed or de-allocated when they are no longer required. Thus, the typical use case of virtual machines 120A, 120B, . . . 120N is to instantiate them as needed and de-allocate them when their use is concluded. Consequently, data stored within one of virtual machines 120A, 120B, . . . 120N may not be persisted.

As a result, in an embodiment, when a guest module determines that data within the virtual machine should be persistently stored, the guest module sends a request to host module 114 to persistently store the data within host 114. To persistently store data describing state changes made to the web browsing session ("state data") at the virtual machine 120A, guest module 124A may send a request to persistently store the state data. Upon receipt of the request, host module 114 stores the data persistently on host 110. Host module 114 may persistently store data at host 110 at state data storage 130. State data storage 130 may be implemented by any mechanism capable of storing data, such as a database or a file system.

In some embodiments, certain state data may be persisted by updating host web browser 112. For example, if the state data which guest module 124A is requesting host module 114 to persistently store is a configuration setting change to the virtualized web browser, a change to the user's bookmarks, or a cookie, then such changes may be stored by updating host web browser 112. Host web browser 112 will thereafter persist such state changes.

Alternately, rather than persistently storing state data at host 110, data may be persistently stored in a virtual machine that is persisted. In such an embodiment, a guest module may communicate with an entity in a virtual machine to store state data within the virtual machine. This embodiment may be useful if it is desired to separate state data from host 110. For example, if there is a possibility of a malicious program residing in the host, by persistently storing the state data in a virtual machine, the malicious program will be unable to inspect the state data, thereby rendering the state data private and secure. In such an embodiment, rather than state data storage 130 residing in host 110 as depicted in FIG. 1, state data storage 130 will reside in a virtual machine, such as one of virtual machines 120A, 120B, . . . 120N, which is configured to be persisted.

The guest module running in each virtual machine has explicit and full visibility into the activity occurring within the virtual machine. The guest module can decide, based on and within the limits of policies contained within policy data, when the guest module should send resources or state data to host 110 to assist in servicing activity performed by the VM web browser. When a VM web browser within a virtual machine decides to update or save new resources, the guest module within that virtual machine may determine, based on the policies within the policy data, to send the information back to host module 114. Host module 114 may decide to either update or add to the data stored in state data store 130 using the information sent by the guest module. Host module 114 may also determine to send updates to any currently running virtual machines that are performing various other navigations or other browser actions based on policy settings and/or knowledge of what is the activity happening in each of the virtual machines. This resource coordination may also make use of the knowledge of what all the virtual machines are doing with applications and resources other than the virtualized web browser.

Figure 4:
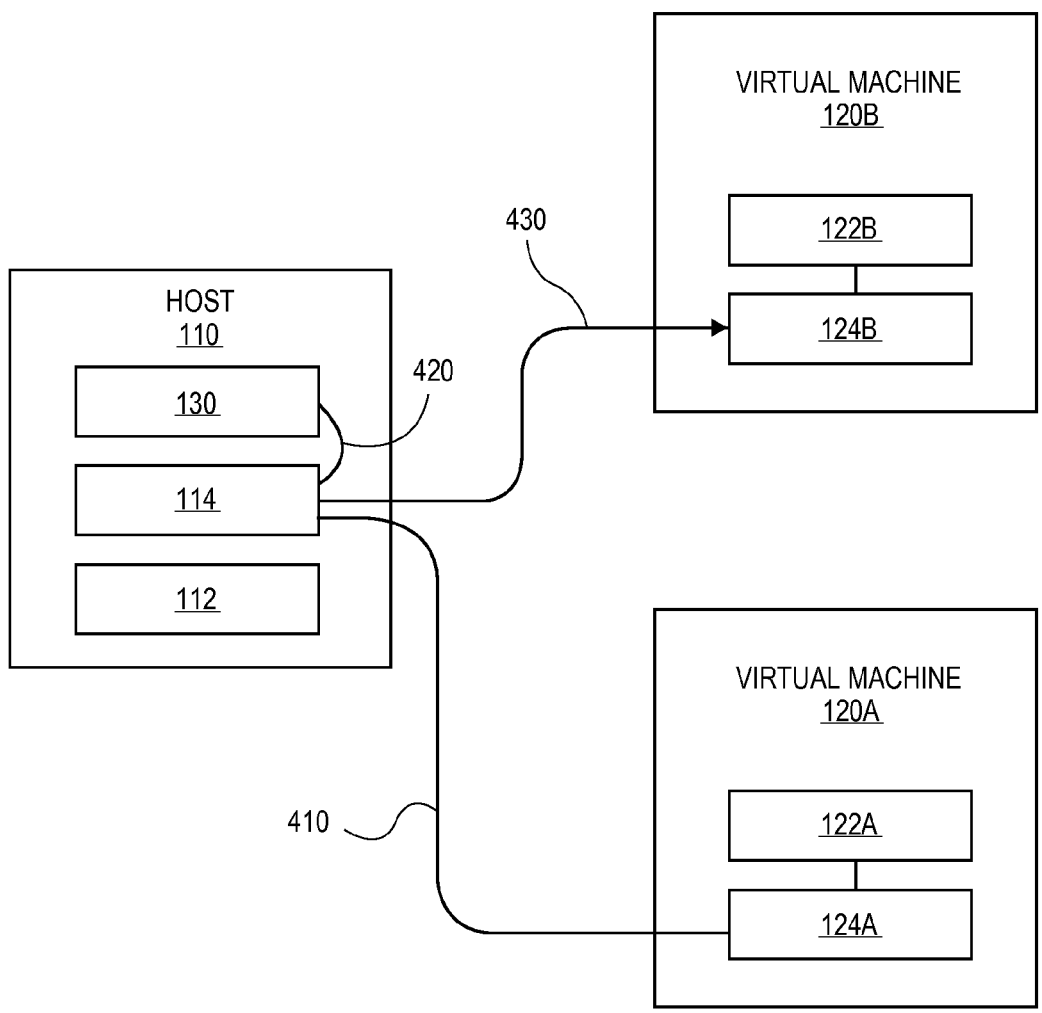
FIG. 4 is an illustration of injecting state data into a virtual machine according to an embodiment of the invention.

It will, on occasion, be necessary to inform a virtual machine about activities performed in a web browsing session that occurred outside of that virtual machine. To do so, state data for a web browsing session is "injected" into that virtual machine. FIG. 4 is an illustration that will be referenced in a discussion of injecting state data into a virtual machine according to an embodiment of the invention. Initially, with reference to FIG. 4, assume that VM web browser 122A is instructed to perform an action by guest module 124A that causes VM web browser 122A to change the state of the web browsing session of the user. Guest module 124A will be cognizant of any change in the web browsing state as guest module 124A monitors the activity performed by VM web browser 122A.

After guest module 124A determines that a state change in the web browsing session for the user has occurred in virtual machine 120A, guest module 124A consults policy data to determine whether such change should be persisted within system 100. The policy data that is consulted by guest module 124A in this regard may be implemented in a variety of ways. The policy data may reside within guest module 124A or may reside elsewhere, such as a persisted virtual machine dedicated to storing policy data. Policy data refers to data that defines one or more policies that are used to shape the behavior of one or more components of the virtualized web browser. Policy data will be described in greater detail below.

Alternately, guest module 124A may be implemented such that guest module 124A causes any state data describing a local change in the state of the web browsing session to be automatically sent to host module 114 rather than doing so based on a consultation with policy data. In such an embodiment, host module 114 may be designed to consult policy data to determine how to process any state data received from a guest module in such an embodiment.

In an embodiment, if guest module 124A determines that the change in state in the web browsing session should be persisted, then the guest module 124A causes state data that describes this change in state to be persistently stored. FIG. 4 depicts this as action 410 embodied as a request to persistently store the state data sent from guest module 124A to host module 114. While, as described above, embodiments may persistently store data using a variety of different mechanisms, the embodiment of FIG. 4 stores state data persistently at host 110 within state data storage 130. When host module 114 receives instruction 410 from guest module 124A, host module 114 stores the state data within state data storage 130 as shown in action 420. This act of host module 114 storing the state data within state data storage 130 need not be automatic, but instead, may be based upon consultation with policy data. For example, policies may be defined to determine whether state data should be persisted at all, whether the state data should be persisted using state data storage 130 or host web browser 112, etc.

The purpose of virtual machine 120A providing host 110 state data to persistently store is to ensure that the necessary information is available to notify components of the virtualized web browser of any relevant activity (or changes in state) that occur in other components of the virtualized web browser. Therefore, after persistently storing relevant state data concerning the activities of the web browsing session occurring in each virtual machine, embodiments send out (or "inject") relevant information to virtual machines as necessary so the VM web browsers executing therein have all the necessary information to provide a seamless user experience.

Injecting state data into a virtual machine is illustrated in FIG. 4 in action 430. As shown by action 430, host module 114 is providing guest module 124B in virtual machine 120B state data. The state data provided to virtual machine 120B identifies information about how the user previously interacted with the virtualized web browser that will be used by VM web browser 122B in retrieving and/or rendering any content.

Note that not all state data for a user need be injected into each virtual machine. For security reasons, it is desirable to only expose the minimum amount of state data to a virtual machine necessary for the VM web browser executing therein to retrieve and render a requested web page properly. By "properly," what is meant is that the requested web page looks and behaves as the user expects based on his or her past history interacting with web site. Said differently, a properly rendered web page takes into account all pertinent state data necessary to resolve the display all content therein. Policies defined by the policy data, therefore, will inject into a virtual machine only the state date which is deemed pertinent to the assigned responsibilities for that virtual machine.

To provide a concrete example, assume that virtual machine 120B is tasked with the responsibility of interacting with social media web sites. Further assume that policies defined within the policy data consider such social media web sites as posing a risk of infection of malicious code. Therefore, it would not be advisable to expose any malicious code that is inadvertently introduced into virtual machine 120B to any cookies associated with the user's sensitive information, such as bank account information, passwords, and the like. Consequently, in an embodiment, when host module 114 injects state data into a virtual machine, host module consults policy data, either stored within host 110 or within a virtual machine that is persistently stored, to identify state data that is pertinent to the assigned responsibilities of the virtual machine, so that only pertinent state data is injected therein.

Injecting state data into a virtual machine may also be performed to warm up a cache within the virtual machine. For example, if a user previously visited a particular web site, cache files for the web site may be persistently stored. If the user visits that web site again and a new virtual machine is instantiated to handle the navigation, the cache files associated with the particular web site may be injected into the newly instantiated virtual machine.

When the state information associated with a virtual machine is to be persisted beyond the lifetime of the virtual machine (as per host module 114), it is convenient to persist this information with an identifier related to the activity being executed in the virtual machine. For example, the top-level domain name (TLD) of the URL being rendered inside the virtual machine may be a convenient identifier. The identifier allows this information to be retrieved when it is needed, such as when this information is injected into a virtual machine created to render a URL with the same TLD as of the virtual machine being destroyed.

Policy Based Decision Making

In embodiments of the invention, the operation of host module 114 and guest modules 124A, 124B, . . . 124N is based, at least in part, upon policies defined in policy data. For example, host module 114 may consult one or more policies defined in policy data to (a) identify which virtual machine should be tasked with the responsibility of servicing a request to retrieve a web page, and/or (b) determine how to instruct a guest module, within the virtual machine designated responsible, to retrieve the web page. Policies may consider a host of factors in determining which virtual machine should service a request to retrieve a web page. For example, the web address, knowledge of any scripts executing on the parent web page, and whether the requested web page is in a new or existing web domain may all play a factor in determining which virtual machines retrieves the requested web page.

When host module 114 receives a subsequent request to display another web page, host module 114 determines, based on policy data accessible to host module 114, whether the same virtual machine that handled the retrieving and rendering of a previous requested web page should retrieve and render the newly requested web page. For example, the policy data may indicate that a newly requested web page has characteristics similar to a previous web page retrieved and rendered by virtual machine 120A. In such as case, host module 114 may task guest module 124A with retrieving and rendering the newly requested web page. In this way, the policy data may treat web pages within the same web page similarly so that all the web pages of a particular domain are serviced within the same virtual machine.

Alternately, the policy data may indicate that the newly requested web page can be processed within the same virtual machine but using a new web browser. In such a case, host module 114 may task guest module 124B with retrieving and rendering the newly requested web page using a newly instantiated web browser in virtual machine 120A other than VM web browser 122A.

Alternately, the policy data may indicate that the newly requested web page should be processed within a different virtual machine than any currently instantiated. In such a case, host module 114 may instantiate a new virtual machine and instruct a guest module, executing within the newly instantiated virtual machine, to retrieve and render the newly requested web page.

Deallocating Virtual Machines in a Controlled Manner

In an embodiment, when a particular virtual machine is no longer required, that virtual machine may be de-allocated. As a result, when host module 114 receives notification that the user is closing the virtualized web browser, host module 114 may, without human intervention, de-instantiate any virtual machine associated with the web browsing session. Thus, any virtual machine that assisted in providing content to the virtualized web browser will be automatically de-instantiated in an embodiment as a result of the user closing the virtualized web browser.

Retrieving Content from Different Domains

A virtualized web browser of an embodiment will have the same visually appearance and support the same features as a traditional web browser. Therefore, like traditional web browsers, a virtualized web browser will support the use of tabs in an embodiment. However, a virtualized web browser may retrieve content to be displayed in a tab in a more secure manner than prior approaches.

In an embodiment, upon the virtualized web browser being instructed to display a new tab, the virtualized web browser displays the new tab without instantiating a new virtual machine. Thus, if a user were to repeated press "Control-T" or a similar mechanism to launch a new tab, the new tab may be created and displayed by the virtualized web browser without instantiating or assigning any virtual machines to retrieve content for the new tab. This advantageously minimizes memory usage of the virtualized web browser.

Once a user instructs the virtualized web browser to display a web page within a tab, host module 114 may consult policy data to determine whether the requested web page may be retrieved and rendered in an existing virtual machine or if a new virtual machine should be instantiated.

In an embodiment, requested web pages from the same domain may be retrieved and rendered within the same virtual machine. In this way, the synchronization of certain resources, such as cache files, is simplified and/or expedited. Thus, if a user requests a web page from a domain in which another web page has already been fetched and rendered within an existing virtual machine, then the newly requested web page may be fetched and rendered within that same virtual machine. On the other hand, if the user requests a web page from a domain from which no web pages have previously been fetched, for example, then a new virtual machine may be instantiated in which to fetch and render that web page.

Synchronizing History Data

Embodiments of the invention seamlessly synchronize resources of a virtualized web browser, and in particular history data, across host 110 and virtual machines 120A, 120B, . . . 120N to present a completely native browser experience to the end user. History data is a type of state data. History data is data that describes a user's navigation history. History data may include the navigation history of the current session as well as web sites and resources previously visited during prior browsing sessions. By synchronizing history data across the virtualized web browser, the user is able to perform any type of operation involving history data in the same manner as in a traditional web browser even though web pages may be retrieved from a plurality of virtual machines.

In an embodiment, history data may include bookmarks for the user. History may also include one or more URLs visited by the user as well as titles of web pages and names of resources used. In order to perform certain operations on a web browser, such as back page and forward page, it is necessary to know the sequence and identity of visited web pages in each tab; therefore, in an embodiment, history data may also identify one or more actions that were performed with respect to a particular tab of the virtualized web browser.

Operations involving these types of resources will be performed seamlessly since any history data pertinent to the function of the various virtual machines will be merged correctly by host module 114. 22 When new history data is created locally within a particular virtual machine, host module 114 is informed of the new state data so that it may be persistently stored and injected into other virtual machines as necessary. For example, if guest module 124A detects that new history data has been created within virtual machine 120A, then guest module 124A may notify host module 114 of the new history data. This may be accomplished in a variety of different ways by embodiments, e.g., guest module 124A may send host module 114 the new history data via a secure communication channel or guest module 124A may cause the new history data to be persistently stored and may notify host module 114 that new history data has been stored and may be retrieved as needed. In an embodiment, host module 114 causes any new history data sent from a virtual machine to be persistently stored so that host module 114 may inject the new history data, as needed, into appropriate virtual machines.

In an embodiment, we optionally do not update history data to identify all actions taken in a virtual machine. For example, if there is a redirect operation performed in a VM web browser, only the final or the first URL may be shared with the host and other VMs, rather than all URLs involved in the redirect.

In an embodiment, history data is used to update the visual appearance of host web browser. For example, back or forward buttons may be displayed as disabled (or "grayed out") or active depending upon the available of appropriate history data to service such operations. When a user initiates the display of a menu in the host operating system that enables the user to navigate previously visited sites, history data will be used to perform the operation. For example, if the user performs a right click operation with his or her mouse to display a menu offering navigation options, or if the user clicks a back or forward button on the virtualized web browser, such navigation commands will be performed using history data obtained from the virtual machines on the system.

Synchronizing Cookies

Embodiments of the invention seamlessly synchronize resources of a virtualized web browser, and in particular cookie data, across host 110 and virtual machines 120A, 120B, . . . 120N to present a completely native browser experience to the end user. Cookie data is a type of state data. Cookie data is data that describes a user's cookies. Cookie data may include cookies dropped in the current session as well as cookies dropping in prior browsing sessions. By synchronizing cookie data across the virtualized web browser, the user is able to perform any type of operation involving cookie data in the same manner as in a traditional web browser even though web pages may be retrieved from a plurality of virtual machines.

In an embodiment, when host module 114 instructs a guest module to coordinate with a VM web browser to retrieve and render a requested web page, host module 114 provides the guest module cookie data. The cookie data identifies one or more cookies deemed to be pertinent to the retrieval of the web page. Rather than relying solely using a push model, certain embodiments may also employ a pull model where the guest module may send a request to host module 114 to ascertain whether there are any additional cookies for the user associated with an embedded web page comprised within the web page. In this way, host module 114 may provide to a guest module any cookie data which host module 114 deems pertinent to the retrieval of a requested web page. However, upon retrieving the requested web page, if the guest module determines that possession of one or more cookies would affect how the requested web page is rendered, then the guest module may communicate with host module 114 to determine if such cookies have been established for the user, and if so, then the guest module may obtain them from host module 114.

The type and amount of cookie data sent from host module 114 to a guest module may be configured using policies defined in the policy data. For example, in an embodiment, host module 114, based on consultation with policy data, may only sent to a guest module cookie data that identifies cookies associated with the top-level domain of the requested web page and does not identify any cookies associated with the domain of any embedded web pages comprised within the requested web page. On the other hand, in other embodiment, policy data may define a different set of policies, and host module 114 in that embodiment may provide, to a guest module, cookie data that identifies cookies associated with the top-level domain of the requested web page and any domain of any embedded web pages comprised within the requested web page. Embodiments may employ policy data that defines a variety of policies for specifying which cookies should be provided to a virtual machine.

Embodiments of the invention may store cookie data using a variety of different mechanisms. Cookie data may be stored in any location and in any manner that state data may be stored. Cookie data may be stored at state data storage 130 in an embodiment. In another embodiment, cookie data may be persistently stored by host web browser 112. In another embodiment, cookie data may be stored in a virtual machine that is persistently stored.

A guest module may employ a variety of mechanisms to determine when a VM web browser drops a cookie. For example, the guest module may detect the performance of set cookie operation via an API, a callback, or a plug-in to the VM web browser.

In an embodiment, a guest module may redirect processing of any set cookie instruction or get cookie instruction comprised within the web page to host module 114. In this way, host module 114 may become a central manager of all cookies throughout the virtualized web browser, regardless of which particular virtual machine is retrieving a web page.

Managing Display Issues

Embodiments of the invention enable a web page retrieved and rendered within a virtual machine by a VM web browser to be displayed upon a physical display device by host web browser 112 executing on host 110. Host module 114 assists in assembling the rendered content obtained from the host or from any virtual machine responsible in contributing rendered content for a web page displayed by host web browser 114.

Certain types of web content may be deemed secure while other types of web content may be deemed insecure. For example, web sites accessible over a secure connection (vis-à-vis a https connection) or web pages hosted internally on an Intranet may be deemed secure (i.e., low risk of comprising malicious software). Other public web sites available on the Internet may be deemed insecure due to the higher level risk that such sites may be infected with malicious code.

Embodiments may treat secure web sites different than insecure web sites. A virtualized web browser of an embodiment may interact with a secure web site using a VM web browser executing with a virtual machine having characteristics specifically tailored to interact with the secure web site. In the same vein, a virtualized web browser of an embodiment may interact with an insecure web site using a VM web browser executing with a virtual machine having characteristics specifically tailored to interact with the insecure web site.

A single web page may contain secure portions and insecure portions. For example, a child web page may be embedded within a parent web page using a HTML construct such as an "iFrame." The parent web page may be deemed secure while the child web page may be deemed insure. In an embodiment, when a requested web page contains both secure and insecure content, a warning may be displayed to the user. The warning may inform the user that the requested web page contains content deemed insecure. The warning may allow the user to consent to assume the risk and continue with processing the web page. If the user wishes to proceed with retrieving the web page, then a new virtual machine may be instantiated for purposes of retrieving the insecure portions of the requested web page. The newly instantiated virtual machine will contains a guest module and a VM web browser. The newly instantiated guest module and VM web browser will cooperate to retrieve and render the insecure portions of the requested web page. Once host module 114 obtains screen data for the insecure and secure portions of the requested web page, host module 114 may assemble the rendered portions of the requested web page and instruct host web browser 112 to display the assembled web page.

Host module 114 may obtain screen data for a rendered portion of a web page in a variety of different ways. For example, in an embodiment, host module 114 may obtain screen data may accessing a frame buffer that stores data representing a rendered portion of a web page. Host module 114 may do so for each virtual machine responsible for rendering a portion of a requested web page. After obtaining all the pieces of the requested web page, host module 114 may assemble the pieces and instruct host web browser 112 to display the assembled web page.

In another embodiment, host module 114 may obtain screen data using an operating system protocol for displaying the contents of one frame in another frame. In this way, the rendered content displayed by a VM web browser may be identified and displayed by host web browser 112.

Note that it may be desirable in certain embodiments to configure a policy to disallow the display of certain types of content. For example, content originating from certain prohibited web sites or possessing certain undesirable characteristics, such as embedded graphics or text associated with one or more keywords, may be prevented from being displayed. In such an embodiment, policy data may be stored which defines one or more polices that demarcate when certain content should or should not be displayed by host web browser 112. When host module 114 obtains screen data, host module 114 may consult the policy data to determine whether it is permissible to display the screen data. If it is not permissible to display a set of screen data, then host module 114 instructs host web browser 112 to display any portion of the web page which is allowed, but redacts any disallowed portions of the requested web page by causing such portions to be displayed blank or with a graphic that explains that the portion is not being displayed for violation of a policy.

In an embodiment, when the virtualized web browser comprises two or more tabs, each tab may be serviced by a separate VM web browser executing within a separate virtual machine.

Managing Downloading and Uploading Files Using a Virtualized Web Browser

Embodiments of the invention provide for a virtualized web browser that supports the same user experience as a traditional web browser. However, unlike traditional web browsers, a virtualized web browser retrieves and renders content within virtual machines which need not be persisted. As a result, how a virtualized web browser supports uploading and downloading files is substantially different than how a traditional web browser supports such functions.

In an embodiment, when the virtualized web browser receives an instruction to download one or more files external to and not an integrated part of the web page (such as when a file is downloaded from a web site), the virtualized web browser displays an interface which enables at least a portion of a file system, maintained by host 110, to be browsed while preventing files stored within a virtual machine to be browsed.

For example, with reference to FIG. 1, assume that host web browser 112 receives an instruction to download one or more files from a web page. Host web browser 112 in turn displays an interface (such as a pop up dialogue box) which enables at least a portion of a file system, maintained by host 110, to be browsed while preventing files stored within any of virtual machines 120A, 120B, . . . 120N to be browsed.

Once host web browser 112 receives input that identifies a target location within the file system maintained by host 110, host web browser 112 instructs a VM web browser to download the one or more files to the target location. Note that in certain embodiment, not all of the file system maintained by host 110 is exposed to the user. In such an embodiment, host module 114 may consult policy data to determine which portions of the file system maintained by host 110 by visible and exposed to the user. Such an embodiment may be used to protect certain files from being tampered with by the user or to hide certain areas of the file system from the user.

In an embodiment, policy data may define a policy that specifies that any files downloaded from outside of a particular region (such as the physical machine itself, the Intranet, one or more specified domains deemed to be trusted, etc.) are deemed untrustworthy. When host module 114 exposes an interface to a virtual machine that facilitates the download of files to a target location, host module 114 may consult policy data to determine how to treat the download files. If, as a result of consulting policy data, host module 114 determines that the downloaded files should be deemed untrustworthy, then host module 114 allows the files to be downloaded to the target location, but additionally stores data that identifies the one or more downloaded files to be untrusted documents. The download files may be subsequently processed differently (such as being opened only in a virtual machine designed to handle untrusted documents) by virtue of being labeled untrusted documents.

The policy data consulted by host module 114 may require that host module 114 store a record in a log file to document any files being downloaded. In this way, the virtualized web browser will produce a record of all the files it downloads. This log file may be configured to contain a variety of other supporting metadata, such as the user downloading the file, the day and time of the download, etc.

Figure 5:
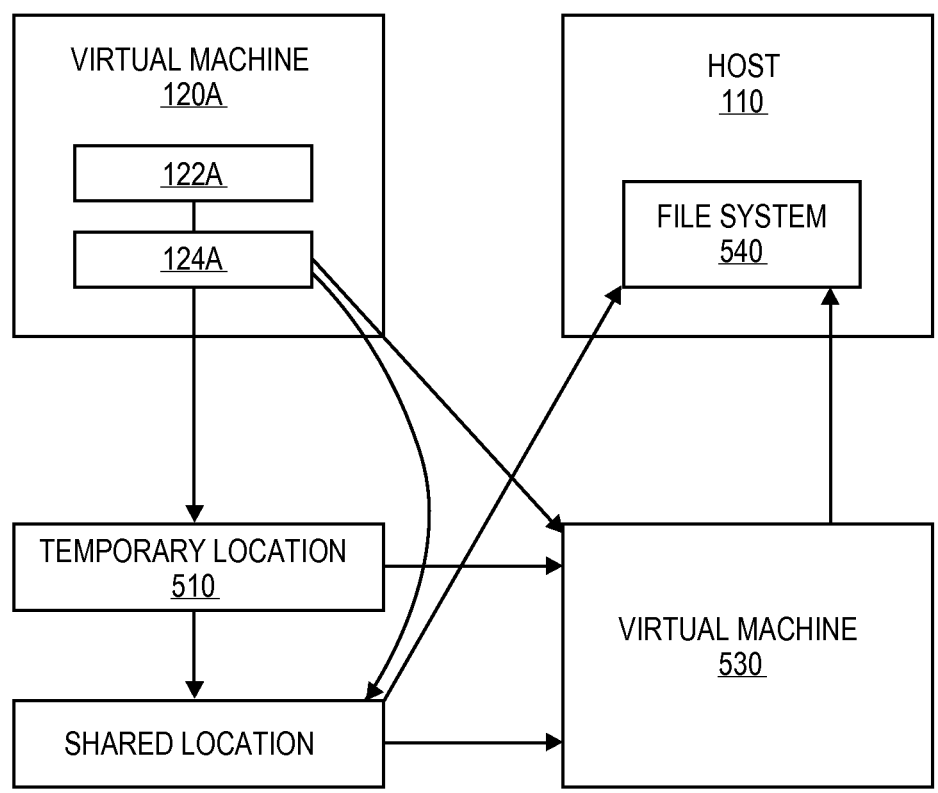
FIG. 5 is an illustration of an application downloading a file to an intermediate location according to an embodiment of the invention.

In an embodiment, prior to storing a copy of the downloaded file to the target location, a copy of the downloaded file may be stored in an intermediate location. To help illustrate this principle, the following description will reference FIG. 5, which is an illustration of downloading a file to an intermediate location according to an embodiment of the invention. FIG. 5 will be used to describe how a file may be downloaded using VM web browser 122A executing in virtual machine 120A to a particular location in file system 540 on host 110.

In an embodiment, policy data will instruct where a downloaded file will initially reside. Different embodiments may employ different approaches for intaking downloaded files. In an embodiment, guest module 124A consults policy data to determine where a file downloaded by VM web browser 122A should be stored. The policy data may indicate that the downloaded file should be stored at temporary location 510. Temporary location 510 may be designed to only store data downloaded from virtual machine 120A or may store data from any virtual machine in system 100.

The purpose of storing a downloaded file in temporary location 510 is to allow analysis on the downloaded file prior to moving the downloaded file to its final destination. Analysis that may be performed on a downloaded file at temporary location 510 includes but is not limited to checking for malicious code, such as a virus. The purpose of running such analysis is to determine if the downloaded file should be deemed safe. Temporarily location 510 may, but need not, be located within a virtual machine.

In an embodiment, after a downloaded file is deemed safe as a result of analysis performed on the downloaded file at temporary location 510, the downloaded file may be transferred to shared location 520. Alternately, a downloaded file may immediately be stored at shared location 520 instead of temporary location 510. In such an embodiment, the analysis that was discussed above as being performed at temporary location 510 may instead be performed at shared location 520, or not performed at all.

Shared location 520 is a location where downloaded files may be stored and accessed by other components within system 100. For example, in an embodiment, a downloaded file is never moved or copied to file system 540. Instead, a downloaded file is copied into shared location 520. A shadow file that links to the downloaded file in shared location 520 is stored at the target location in file system 540. A user browsing to the location in file system 540 where he or she wanted to store a copy of the downloaded file would instead see the shadow file. The user may not be able to ascertain that the shadow file is not the downloaded file. The shadow file may be moved or copied into any location. If an operation is to be performed on the shadow file (for example, the user clicks on the shadow file to open up the file), the link between the shadow file and the download file will be traversed and the operation will be performed against the downloaded link within shared location 520 (for example, clicking on the shadow file within file system 540 will cause the downloaded file within shared location 520 to open in a virtual machine). The advantage of this embodiment is that if the downloaded file contains malicious code that is undetected, the malicious code will remain outside of host 110, thereby minimizing or preventing infection. In another embodiment, if a downloaded file is deemed safe within shared location 520, then it may be moved to the target location within file system 540.

Shared location 520 may be implemented within a virtual machine. Alternately, downloaded files may be stored directly into a virtual machine, such as virtual machine 530 in FIG. 5. As shown in FIG. 5, a downloaded file may be stored directly into virtual machine 530 by VM web browser 122A or the downloaded file may be transferred from either temporary location 510 or shared location 520. Virtual machine 530 is intended to represent a secure repository for downloaded files. In an embodiment, a new virtual machine 530 may be instantiated for each downloaded file to provide a pristine environment in which analysis may be performed to determine whether the downloaded file contains any malicious code. In an embodiment, if a downloaded file is deemed safe within virtual machine 530, then it may be moved to the target location within file system 540.

Note that embodiments need not implement all of temporary location 510, shared location 520, and virtual machine 530, as embodiments may implement zero or more of these features. The discussion of these components is meant to illustrate the variety of design choices embodiments of the invention enjoy in implementing a quarantined area for downloaded files to facilitate the performance of analysis upon the downloaded files.

Embodiments may move a downloaded file to host 110 using a variety of different approaches. Policy data may specify a particular mechanism to use in moving a downloaded file into file system 540 based on the size of the downloaded file. For example, based on the size of the downloaded file, it may be more efficient to move the downloaded file into file system 540 by way of a network connection, by way of copying to disk, or by way of copying into memory.

Figure 6:
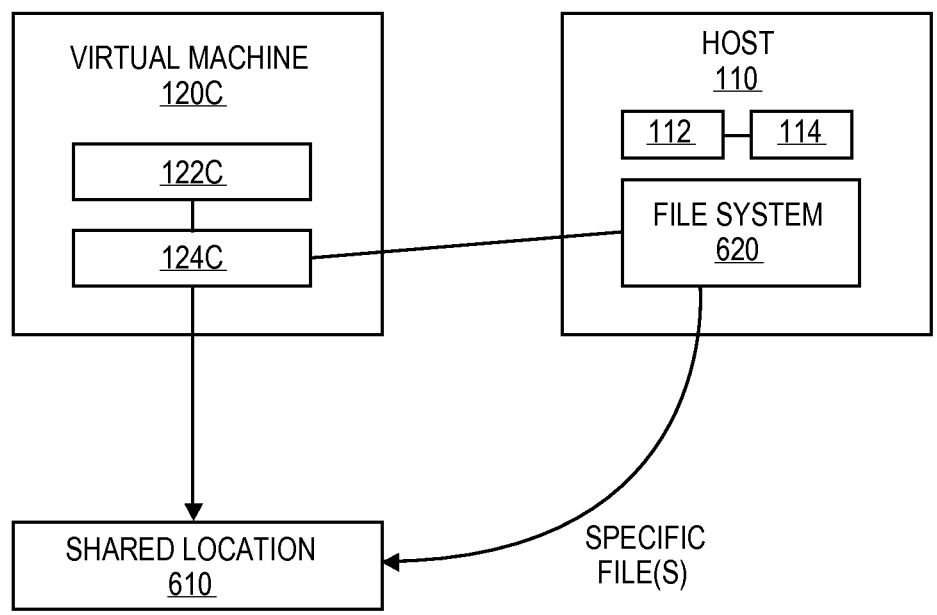
FIG. 6 is an illustration of an application uploading a file to an intermediate location according to an embodiment of the invention.

Embodiments also support uploading files. FIG. 6 is an illustration of uploading a file according to an embodiment of the invention. In an embodiment, a user may instruct host web browser 112 to upload one or more files. Host web browser 112 will communicate this instruction to host module 114. When host module 114 receives an instruction to upload one or more files stored locally to an external target location, host module 114 displays an interface which enables at least a portion of a file system, maintained by host 110, to be browsed while preventing files stored within any virtual machine to be browsed. When host module 114 receives input identifying one or more files in the file system, host module 114 moves the selected files to shared location 610.

Guest module 124C is instructed by host module 114 to upload the selected files in shared location 610. Therefore, guest module 124C communicates with VM web browser 122C to cause VM web browser 122C to upload the selected files from shared location 610 to the target location. Advantageously, only the particular files to be uploaded are exposed to virtual machine 120C, as the remainder of the files in file system 620 remain inaccessible to virtual machine 120C. If any malicious code were to reside within a virtual machine such as virtual machine 120C, the malicious code would be prevented from inspecting the files within file system 620 or obtaining any data therein.

Policy data consulted by host module 114 may require that host module 114 store a record in a log file to document any files being uploaded. In this way, the virtualized web browser will produce a record of all files uploaded using the virtualized web browser. This log file may be configured to contain a variety of other supporting metadata, such as the user uploading the file, the day and time of the upload, where the file(s) were uploaded, etc.

Extensions

Note that embodiments of the invention have been chiefly described with reference to a virtualized web browser. However, the principles presented herein are equally application to other types of applications. Indeed, the teachings described above are equally applicable to any type of virtualized application, such as a virtualized email client or virtualized email server. In such an embodiment, rather than retrieving and rendering web pages within virtual machines, each virtual machine may retrieve and render email or email attachments. Host 110 may be implemented on a cell phone, tablet PC, and the like, and virtual machines 120A, 120B, . . . 120N may reside in a data center or other remote location. When a user instructs the cell phone or tablet PC to display an email or an email attachment, the request could be routed to a particular virtual machine, which retrieves the email, renders the email or email attachment to produce screen data, and sends the screen data to the cell phone or tablet PC for display.

Hardware Mechanisms

Figure 7:
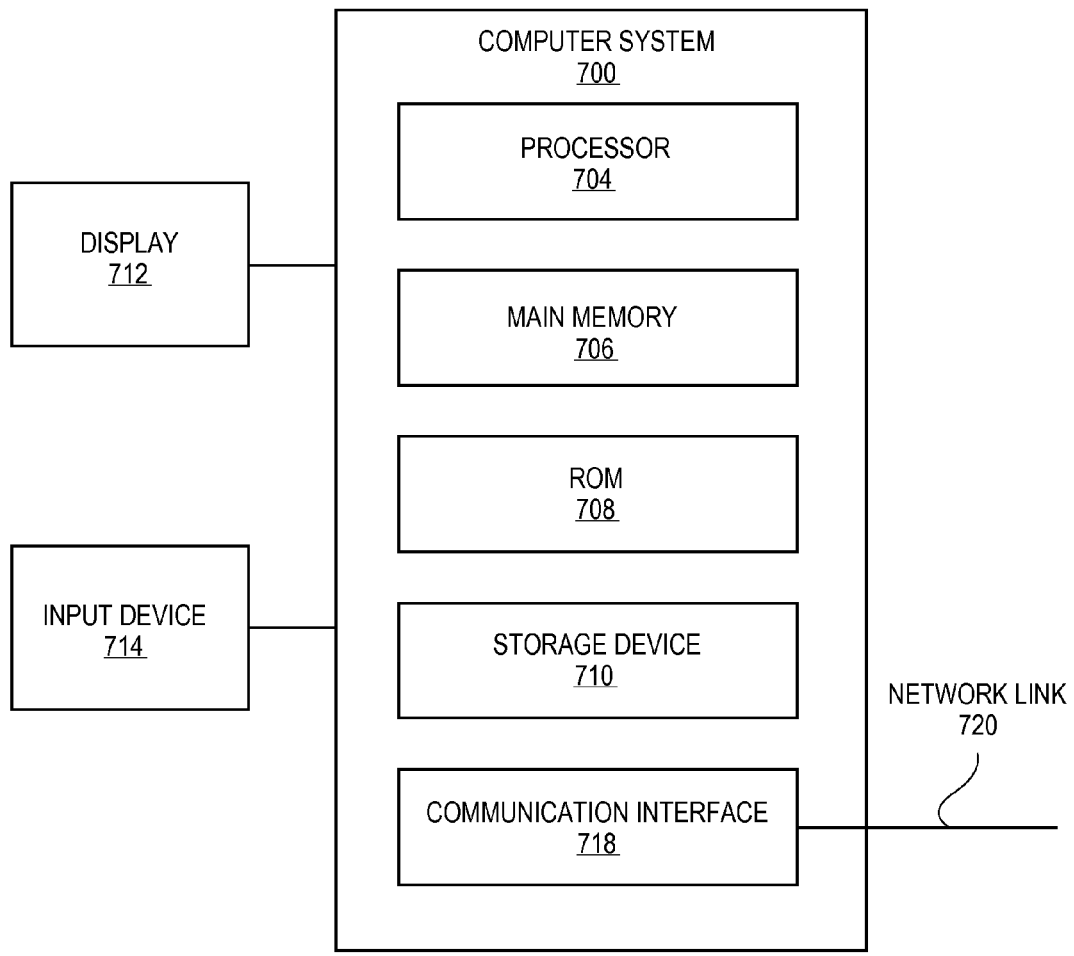
FIG. 7 is a block diagram that illustrates a computer system upon which an embodiment of the invention may be implemented.

In an embodiment, host 110 and one or more of virtual machines 120A, 120B, . . . 120N of FIG. 1 may be implemented on a computer system. FIG. 7 is a block diagram that illustrates a computer system 700 upon which an embodiment of the invention may be implemented. In an embodiment, computer system 700 includes processor 704, main memory 706, ROM 708, storage device 710, and communication interface 718. Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device for storing static information and instructions for processor 704. A storage device 710, such as a magnetic disk or optical disk, is provided for storing information and instructions.

Computer system 700 may be coupled to a display 712, such as a cathode ray tube (CRT), a LCD monitor, and a television set, for displaying information to a user. An input device 714, including alphanumeric and other keys, is coupled to computer system 700 for communicating information and command selections to processor 704. Other non-limiting, illustrative examples of input device 714 include a mouse, a trackball, or cursor direction keys for communicating direction information and command selections to processor 704 and for controlling cursor movement on display 712. While only one input device 714 is depicted in FIG. 7, embodiments of the invention may include any number of input devices 714 coupled to computer system 700.

Embodiments of the invention are related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 704 for execution. For example, the instructions may initially be carried on a magnetic disk of a remote computer. The remote computer can load the instructions into its dynamic memory and send the instructions over a network link 720 to computer system 700.

Communication interface 718 provides a two-way data communication coupling to a network link 720 that is connected to a local network. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through a local network to a host computer or to data equipment operated by an Internet Service Provider (ISP).

Computer system 700 can send messages and receive data, including program code, through the network(s), network link 720 and communication interface 718. For example, a server might transmit a requested code for an application program through the Internet, a local ISP, a local network, subsequently to communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for transferring a file using a virtualized application, which when executed by one or more processors, cause:

executing the virtualized application within a first isolated environment executing on a physical machine;

upon the virtualized application receiving an instruction to download one or more files stored external to the physical machine, the virtualized application requesting, from a second isolated environment, information identifying at least a portion of a file system, maintained by said second isolated environment, which is visible to said first isolated environment;

after said first isolated environment receiving said information from said second isolated environment, said first isolated environment generating an appearance of an interface that enables said at least portion of the file system, maintained by said second isolated environment, to be browsed while preventing files stored within the first isolated environment to be browsed;

upon the second isolated environment receiving display data from the first isolated environment, the second isolated environment displaying the interface rendered by the first isolated environment, wherein said display data describes said appearance of said interface; and upon the virtualized application receiving input, from said interface, identifying a target location within said file system, the virtualized application storing said one or more files at said target location.

2. The one or more non-transitory computer-readable storage mediums of claim 1, wherein the virtualized application consults policy data to determine which portions of the file system are visible to the virtualized application.

3. The one or more non-transitory computer-readable storage mediums of claim 1, wherein the virtualized application is one of a virtualized web browser, a virtualized email application, and a virtualized application for displaying documents or pictures.

4. The one or more non-transitory computer-readable storage mediums of claim 1, wherein execution of the one or more sequences of instructions further causes:

as a result of consulting a policy, storing data that identifies the one or more files stored at the target location as untrusted documents.

5. The one or more non-transitory computer-readable storage mediums of claim 1, wherein execution of the one or more sequences of instructions further causes:

storing a record, in a log file, which evidences that the one or more files were stored at the target location.

6. One or more non-transitory computer-readable storage mediums storing one or more sequences of instructions for transferring a file using a virtualized application, which when executed by one or more processors, cause:

executing the virtualized application within a first isolated environment executing on a physical machine;

upon the virtualized application receiving an instruction to download one or more files stored external to the physical machine, the virtualized application causing a second isolated environment executing on the physical machine to display an interface that enables at least a portion of a file system, maintained by said second isolated environment, to be browsed while preventing files stored within the first isolated environment to be browsed; and upon the virtualized application receiving input identifying a target location within said file system, the virtualized application storing said one or more files at said target location, wherein the virtualized application storing said one or more files comprises:

prior to storing the one or more files at said target location, storing the one or more files at an intermediate location;

performing analysis on said one or more files at said intermediate location to render the one or more files safe or verify whether the one or more files should be deemed safe; and only upon the one or more files being deemed safe as a result of performing said analysis, moving said one or more files from said intermediate location to said target location.

7. The one or more non-transitory computer-readable storage mediums of claim 6, wherein the intermediate location is one of a plurality of intermediate locations that are each associated within a particular isolated environment in which a file transfer was initiated.

8. The one or more non-transitory computer-readable storage mediums of claim 6, wherein the intermediate location is a particular isolated environment that is instantiated for the purpose of performing said analysis on said one or more files.

9. The one or more non-transitory computer-readable storage mediums of claim 6, wherein moving said one or more files from said intermediate location to said target location comprises:

determining whether to move said one or more files from said intermediate location to said target location via a network connection, via copying to disk, or via copying into memory based on the size of said one or more files.

10. One or more non-transitory computer-readable storage mediums storing one or more sequences of instructions for transferring a file using a virtualized application, which when executed by one or more processors, cause:

executing the virtualized application within a first isolated environment executing on a physical machine;

upon the virtualized application receiving an instruction to download one or more files stored external to the physical machine, the virtualized application requesting, from a second isolated environment, information identifying at least a portion of a file system, maintained by said second isolated environment, which is visible to said first isolated environment;

after said first isolated environment receiving said information from said second isolated environment, said first isolated environment generating an appearance of an interface which enables said at least portion of the file system, maintained by said second isolated environment, to be browsed while preventing any files stored within the first isolated environment to be browsed;

upon the second isolated environment receiving display data from the first isolated environment, the second isolated environment displaying the interface rendered by the first isolated environment, wherein said display data describes said appearance of said interface; and upon the virtualized application receiving input, from said interface, identifying a target location within said file system, performing:

storing said one or more files at a quarantined location external to said file system, and storing linking data, at the target location within the file system, which identifies a path to the one or more files at the quarantined area.

11. One or more non-transitory computer-readable storage mediums storing one or more sequences of instructions for transferring a file using a virtualized web browser, which when executed by one or more processors, cause:

executing the virtualized web browser within a first isolated environment that is executing on a physical machine;

the virtualized web browser requesting, from a second isolated environment, information identifying at least a portion of a file system, maintained by said second isolated environment, which is visible to said first isolated environment;

after said first isolated environment receiving said information from said second isolated environment, said first isolated environment generating an appearance of an interface which enables said at least portion of the file system, maintained by said second isolated environment, to be browsed while preventing files stored within the first isolated environment to be browsed;

upon the second isolated environment receiving display data from the first isolated environment, the second isolated environment displaying the interface rendered by the first isolated environment, wherein said display data describes said appearance of said interface; and upon the virtualized web browser receiving input, from said interface, identifying one or more files in said file system, the virtualized web browser causing said one or more files to be transferred to said first isolated environment; and upon said first isolated environment receiving said one or more files, said first isolated environment causing said one or more files to be stored at a target location located over a network.

12. The one or more non-transitory computer-readable storage mediums of claim 11, wherein execution of the one or more sequences of instruction further causes:

storing a record, in a log file, which evidences that the one or more files were stored at the target location.

13. An apparatus for transferring a file using a virtualized application, comprising:

one or more processors; and one or more computer-readable storage mediums storing one or more sequences of instructions, which when executed, cause:

executing the virtualized application within a first isolated environment executing on a physical machine;

upon the virtualized application receiving an instruction to download one or more files stored external to the physical machine, the virtualized application requesting, from a second isolated environment, information identifying at least a portion of a file system, maintained by said second isolated environment, which is visible to said first isolated environment;

after said first isolated environment receiving said information from said second isolated environment, said first isolated environment generating an appearance of an interface that enables said at least portion of the file system, maintained by said second isolated environment, to be browsed while preventing files stored within the first isolated environment to be browsed;

upon the second isolated environment receiving display data from the first isolated environment, the second isolated environment displaying the interface rendered by the first isolated environment, wherein said display data describes said appearance of said interface; and upon the virtualized application receiving input, from said interface, identifying a target location within said file system, the virtualized application storing said one or more files at a target location located over a network.

14. The apparatus of claim 13, wherein the virtualized application consults policy data to determine which portions of the file system are visible to the virtualized application.

15. The on apparatus of claim 13, wherein the virtualized application is one of a virtualized web browser, a virtualized email application, and a virtualized application for displaying documents or pictures.

16. The apparatus of claim 13, wherein execution of the one or more sequences of instructions further cause:
   as a result of consulting a policy, storing data that identifies the one or more files stored at the target location as untrusted documents.

17. The apparatus of claim 13, wherein execution of the one or more sequences of instructions further causes:
   storing a record, in a log file, which evidences that the one or more files were stored at the target location.

18. An apparatus for transferring a file using a virtualized application, comprising:
   one or more processors; and
   one or more computer-readable storage mediums storing one or more sequences of instructions, which when executed, cause:
   executing the virtualized application within a first isolated environment executing on a physical machine;
   upon the virtualized application receiving an instruction to download one or more files stored external to the physical machine, the virtualized application causing a second isolated environment executing on the physical machine to display an interface that enables at least a portion of a file system, maintained by said second isolated environment, to be browsed while preventing files stored within the first isolated environment to be browsed; and
   upon the virtualized application receiving input identifying a target location within said file system, the virtualized application storing said one or more files at said target location, wherein the virtualized application storing said one or more files comprises:
   prior to storing the one or more files at said target location, storing the one or more files at an intermediate location;
   performing analysis on said one or more files at said intermediate location to render the one or more files safe or verify whether the one or more files should be deemed safe; and
   only upon the one or more files being deemed safe as a result of performing said analysis, moving said one or more files from said intermediate location to said target location.

19. The apparatus of claim 18, wherein the intermediate location is one of a plurality of intermediate locations that are each associated within a particular isolated environment in which a file transfer was initiated.

20. The apparatus of claim 18, wherein the intermediate location is a particular isolated environment that is instantiated for the purpose of performing said analysis on said one or more files.

21. The apparatus of claim 18, wherein moving said one or more files from said intermediate location to said target location comprises:
   determining whether to move said one or more files from said intermediate location to said target location via a network connection, via copying to disk, or via copying into memory based on the size of said one or more files.

22. An apparatus for transferring a file using a virtualized application, comprising:
   one or more processors; and
   one or more computer-readable storage mediums storing one or more sequences of instructions, which when executed, cause:
   executing the virtualized application within a first isolated environment executing on a physical machine;
   upon the virtualized application receiving an instruction to download one or more files stored external to the physical machine, the virtualized application requesting, from a second isolated environment, information identifying at least a portion of a file system, maintained by said second isolated environment, which is visible to said first isolated environment;
   after said first isolated environment receiving said information from said second isolated environment, said first isolated environment generating an appearance of an interface which enables said at least portion of the file system, maintained by said second isolated environment, to be browsed while preventing any files stored within the first isolated environment to be browsed; and
   upon the second isolated environment receiving display data from the first isolated environment, the second isolated environment displaying the interface rendered by the first isolated environment, wherein said display data describes said appearance of said interface;
   upon the virtualized application receiving input, from said interface, identifying a target location within said file system, performing:
   storing said one or more files at a quarantined location external to said file system, and
   storing linking data, at the target location within the file system, that identifies a path to the one or more files at the quarantined area.

23. An apparatus for transferring a file using a virtualized web browser, comprising:
   one or more processors; and
   one or more computer-readable storage mediums storing one or more sequences of instructions, which when executed, cause:
   executing the virtualized web browser within a first isolated environment that is executing on a physical machine;
   the virtualized web browser requesting, from a second isolated environment, information identifying at least portion of a file system, maintained by said second isolated environment, which is visible to said first isolated environment;
   after said first isolated environment receiving said information from said second isolated environment, said first isolated environment generating an appearance of an interface which enables said at least portion of the file system, maintained by said second isolated environment, to be browsed while preventing files stored within the first isolated environment to be browsed;
   upon the second isolated environment receiving display data from the first isolated environment, the second isolated environment displaying the interface rendered by the first isolated environment, wherein said display data describes said appearance of said interface;
   upon the virtualized web browser receiving input, from said interface, identifying one or more files in said file system, the virtualized web browser causing said one or more files to be transferred to said first isolated environment; and
   upon said first isolated environment receiving said one or more files, said first isolated environment causing said one or more files to be stored at said target location.

24. The apparatus of claim 23, wherein execution of the one or more sequences of instruction s further causes:

storing a record, in a log file, which evidences that the one or more files were stored at the target location.

\* \* \* \* \*